(12) United States Patent
McRoberts et al.

(10) Patent No.: US 10,882,119 B2
(45) Date of Patent: Jan. 5, 2021

(54) CHUCK SLEEVE FOR POWER TOOL

(71) Applicant: BLACK & DECKER INC., Newark, DE (US)

(72) Inventors: Jason McRoberts, Windsor, PA (US); David Miller, Baltimore, MD (US); Oleksiy Sergyeyenko, Baldwin, MD (US)

(73) Assignee: Black & Decker Inc., New Britain, CT (US)

( * ) Notice: Subject to any disclaimer, the term of this patent is extended or adjusted under 35 U.S.C. 154(b) by 1205 days.

(21) Appl. No.: 14/174,496

(22) Filed: Feb. 6, 2014

(65) Prior Publication Data
US 2014/0262409 A1 Sep. 18, 2014

Related U.S. Application Data

(60) Provisional application No. 61/781,825, filed on Mar. 14, 2013.

(51) Int. Cl.
*B23B 31/12* (2006.01)
*B23Q 11/08* (2006.01)
*B25F 5/02* (2006.01)

(52) U.S. Cl.
CPC ...... *B23B 31/1207* (2013.01); *B23B 31/1238* (2013.01); *B23Q 11/0883* (2013.01); *B25F 5/02* (2013.01); *B23B 2231/38* (2013.01); *Y10T 279/34* (2015.01)

(58) Field of Classification Search
CPC ............................. B23B 31/12; B23B 31/1207
USPC ......................................................... 173/216
See application file for complete search history.

(56) References Cited

U.S. PATENT DOCUMENTS

| | | | |
|---|---|---|---|
| 2,155,082 A | 4/1939 | Decker | |
| 3,776,647 A | 12/1973 | Hart | |
| 4,040,311 A * | 8/1977 | Page, Jr. ................ | A61C 1/185 173/169 |
| 5,882,153 A | 3/1999 | Mack et al. | |
| 5,927,914 A | 7/1999 | Mack et al. | |
| 5,988,958 A | 11/1999 | Mack | |
| 6,595,527 B2 | 7/2003 | Mack | |
| 7,243,923 B2 * | 7/2007 | Campbell ........... | B23B 31/1238 279/133 |
| 7,273,214 B2 * | 9/2007 | Harris .................. | B23B 31/123 279/62 |

(Continued)

FOREIGN PATENT DOCUMENTS

| DE | 2160831 A1 | 6/1973 |
|---|---|---|
| DE | 2604348 A1 | 8/1977 |

(Continued)

*Primary Examiner* — Dariush Seif
(74) *Attorney, Agent, or Firm* — Stephen R. Valancius

(57) ABSTRACT

A power tool is provided and includes a housing, a motor, a gear case, a bearing assembly, and a chuck assembly. The motor is disposed in the housing and defines an axis of rotation. The gear case is coupled to the motor and includes a proximal end and a distal end. The proximal end of the gear case is coupled to the housing. The bearing assembly extends from the distal end of the gear case along the axis of rotation and supports a driveshaft for rotation about the axis of rotation. The chuck assembly is rotatably coupled to the driveshaft and includes a chuck sleeve annularly surrounding the bearing assembly about the axis of rotation.

10 Claims, 2 Drawing Sheets

(56) References Cited

U.S. PATENT DOCUMENTS

| | | | |
|---|---|---|---|
| 7,478,979 | B2 | 1/2009 | Zhou et al. |
| 7,481,608 | B2 | 1/2009 | Zhou et al. |
| 7,832,965 | B2 | 11/2010 | Mack |
| 8,459,905 | B2 | 6/2013 | Nickels, Jr. et al. |
| 8,727,034 | B2 * | 5/2014 | Leong ............... B25B 21/00 173/216 |
| 2006/0088393 | A1 | 4/2006 | Cooper |
| 2006/0170167 | A1 * | 8/2006 | Gehret ............ B23B 31/1238 279/62 |
| 2009/0066039 | A1 | 3/2009 | Cachod |
| 2009/0140500 | A1 * | 6/2009 | Cachod ........... B23B 31/1215 279/62 |
| 2011/0000692 | A1 | 1/2011 | Roehm |
| 2012/0111594 | A1 * | 5/2012 | Herr ............... B23B 31/1207 173/104 |
| 2013/0270779 | A1 | 10/2013 | Campbell et al. |

FOREIGN PATENT DOCUMENTS

| | | |
|---|---|---|
| EP | 2537612 A2 | 12/2012 |
| FR | 2883210 A1 | 9/2006 |
| GB | 485224 A | 5/1938 |

\* cited by examiner

CHUCK SLEEVE FOR POWER TOOL

CROSS-REFERENCE TO RELATED APPLICATIONS

This application claims the benefit of U.S. Provisional Application No. 61/781,825, filed on Mar. 14, 2013. The entire disclosure of the above application is incorporated herein by reference.

FIELD

The present disclosure relates to a chuck assembly for attachment of accessories to a power tool, and more particularly to a chuck sleeve suitable for use in a power tool such as a drill or driver.

BACKGROUND

Various types of power tools, such as drills and drivers, include a gear system and a chuck assembly. The gear system may include a bearing assembly for supporting a drive shaft which is operable to transmit torque from the gear system to the chuck assembly. In some power tools, the gear system includes a gear casing which surrounds and supports the bearing assembly.

The chuck assembly can removably secure a drill bit or other accessory to the power tool. Some chuck assemblies are known in the art as keyless chuck assemblies, which allow the user to grip and rotate a chuck sleeve to remove and/or secure the drill bit, without the use of a key or other similar tool. While rotating a chuck sleeve to remove and/or secure a drill bit or other accessory, it may be desirable to provide a surface on the chuck sleeve for the user to grip.

While known chuck sleeves and gear casings have proven to be acceptable for their intended purposes, a continuous need for improvement in the relevant arts remains.

This section provides background information related to the present disclosure which is not necessarily prior art.

SUMMARY

This section provides a general summary of the disclosure, and is not a comprehensive disclosure of its full scope or all of its features.

According to one particular aspect, the present disclosure provides a power tool, such as a drill. The drill includes a housing, a motor, a gear case, a bearing assembly, and a chuck assembly. The motor is disposed in the housing and defines an axis of rotation. The gear case is coupled to the motor and includes a proximal end and a distal end. The proximal end of the gear case is coupled to the housing. The bearing assembly extends from the distal end of the gear case along the axis of rotation and supports a driveshaft for rotation about the axis of rotation. The chuck assembly is rotatably coupled to the driveshaft and includes a chuck sleeve annularly surrounding the bearing assembly about the axis of rotation.

According to another particular aspect, the present disclosure provides a power tool, such as a drill. The power tool includes a driveshaft, a gear system, a bearing assembly, and a chuck assembly. The driveshaft defines an axis of rotation. The gear system is coupled to a first portion of the driveshaft. The gear system includes a gear case extending along the axis of rotation from and between a proximal end and a distal end. The bearing assembly is coupled to a second portion of the driveshaft. The bearing assembly extends along the axis of rotation from the distal end of the gear case. The chuck assembly is rotatably coupled to a third portion of the driveshaft. The chuck assembly includes a chuck sleeve annularly surrounding the bearing assembly along the axis of rotation.

According to yet another particular aspect, the present disclosure provides a power tool, such as a drill. The power tool includes a driveshaft, a gear system, a bearing assembly, and a chuck assembly. The driveshaft defines an axis of rotation. The gear system is coupled to a first portion of the driveshaft. The gear system includes a gear case extending along the axis of rotation from and between a proximal end and a distal end. The bearing assembly is coupled to a second portion of the driveshaft. The bearing assembly extends along the axis of rotation from the distal end of the gear case. The chuck assembly is rotatably coupled to a third portion of the driveshaft. The chuck assembly includes a chuck body, a chuck sleeve, a plurality of chuck jaws, and a radially inwardly extending flange. The chuck sleeve annularly surrounds the chuck body. The plurality of chuck jaws include a rearward end slidably supported by the chuck body. The radially inwardly extending flange is adjacent to the rearward end of the chuck jaws. A forward end of the bearing assembly and a rearward end of the flange define a gap extending a distance X2 along the axis of rotation.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
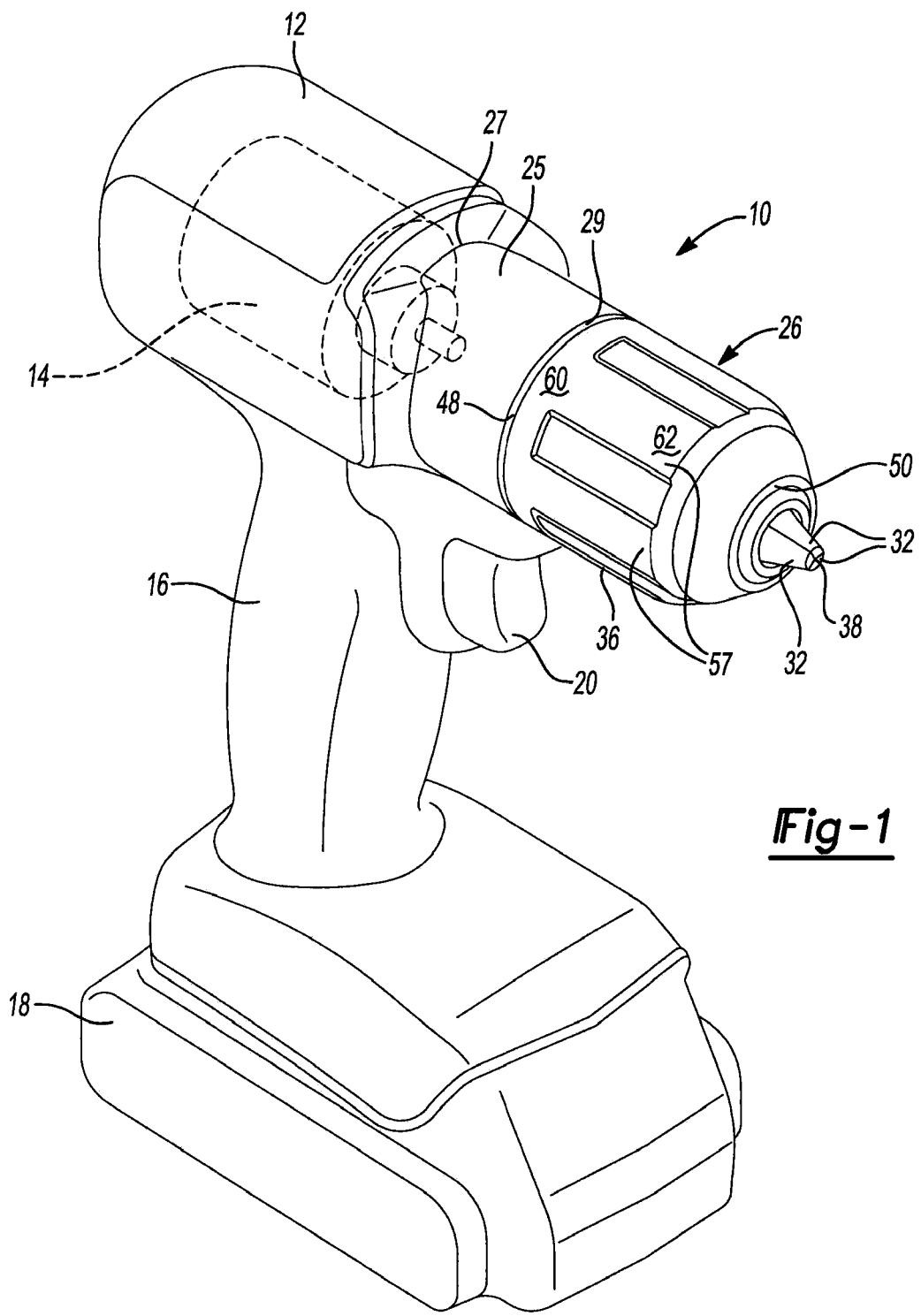
FIG. 1 is a perspective view of a power tool including a chuck sleeve in accordance with the principles of the present disclosure.
Figure 2:
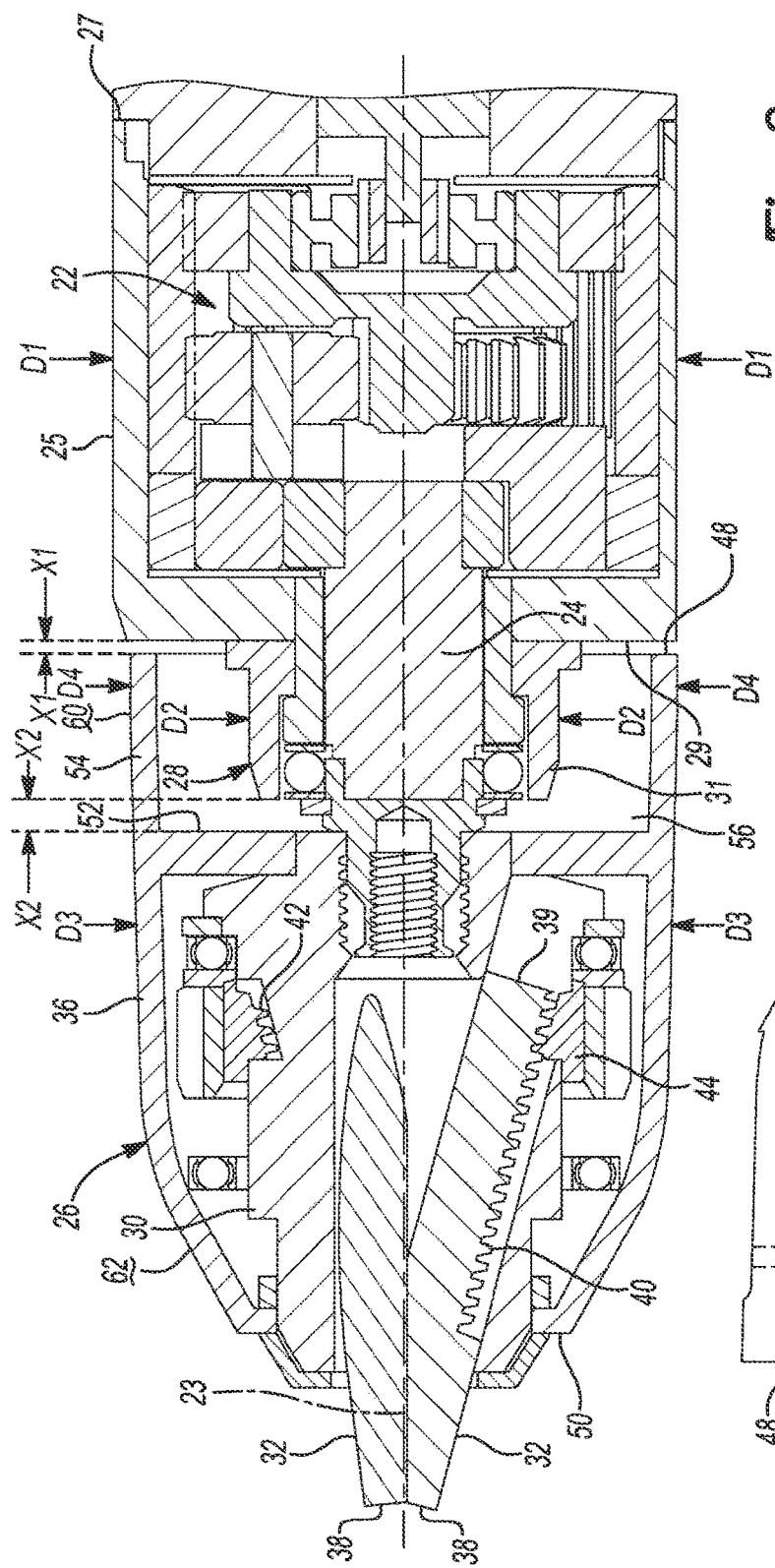
FIG. 2 is a cross-sectional view of the power tool of FIG. 1.

With reference to FIG. 1, a power tool in accordance with the present disclosure is illustrated and designated with the reference numeral 10. The power tool 10 will be described in the context of a power drill and will be referred to as drill 10; however, it should be understood that the drill 10 can be other types of power tools such as a screwdriver, an impact driver, a hammer drill, a router, or the like.

The drill 10 includes a clamshell housing 12 which surrounds a motor 14. The housing 12 includes a handle 16 which includes a power source 18 coupled with the handle. The power source 18 is shown as a battery, however, an AC cord could be used. An activation member 20 is electrically coupled with the motor 14 and the power source 18. The activation member 20 energizes and de-energizes the motor 14. The motor 14 is coupled with a gear system 22 which includes a shaft 24. The gear system 22 drives the shaft 24 to rotate about an axis 23. The gear system 22 is surrounded by a gear case 25 extending axially from a proximal end 27 to a distal end 29. The gear case 25 may be substantially cylindrical, having a first diameter D1.

A bearing assembly 28 extends axially from the distal end 29 of the gear case 25. The bearing assembly 28 may include a housing 31 having a second outer diameter D2. The second outer diameter D2 may be less than the first diameter D1 of the gear case 25. The bearing assembly 28 rotatably supports the shaft 24 which is coupled to a chuck assembly 26. Upon activation of the activating member 20, the motor drives the gear system 22 which, in turn, drives the shaft 24 to rotate within the bearing assembly 28 to rotate the chuck assembly 26.

As indicated herein, the chuck assembly 26 may be provided on a power driver (e.g., a drill) for holding an accessory (e.g., a drill bit). It will be appreciated, however, that the chuck assembly 26 may be suitably implemented on a variety of power drivers (other than drills) for holding a variety of accessories (other than drill bits).

The chuck assembly 26 may include a chuck body 30, a plurality of chuck jaws 32, a clutch mechanism (not shown), and a chuck sleeve 36. The rear end of the chuck body 30 may be fixedly mounted on the shaft 24. The forward end of the chuck body 30 may have passageways that slidably support the plurality of chuck jaws 32. The chuck jaws 32 may be inclined so that respective forward ends 38 of the chuck jaws 32 converge toward the axis 23 and respective rearward ends 39 of the chuck jaws 32 diverge from the axis 23. The clutch mechanism may rotationally lock the shaft 24 and the chuck assembly 26 together up to a predetermined torque threshold. Once the predetermined torque threshold is reached, the clutch mechanism may give way (or slip) to limit the torque that may be applied during the chuck actuating process. Further, the clutch mechanism may be designed so that the predetermined threshold for tightening the chuck assembly 26 may be less than the predetermined threshold for loosening the chuck assembly 26. The clutch mechanism may be an electronic clutch mechanism which stops transmitting torque to the chuck assembly 26 and jaws 32 by, for example, stopping the motor 14. The electronic clutch mechanism may stop the motor 14 upon reaching a particular torque or based upon some other factor or combination of factors. Examples of potential electronic clutch mechanisms are shown and described in commonly owned U.S. Publication Nos. 2013/0327552 and 2013/0269961, which are incorporated by reference as if fully set forth herein.

In this example embodiment, the chuck jaws 32 are illustrated as being "threaded" chuck jaws. That is, the chuck jaws 32 may be actuated (i.e., advanced and/or retracted) via radially outward facing threads 40 interacting with radially inward facing threads 42 of a nut 44. However, the present invention is not limited in this regard. For example, "pusher" jaws may be suitably implemented and supported by the chuck body. Pusher jaws are well known in this art, and therefore a detailed discussion of the same is omitted. The chuck sleeve 36 may also fixedly carry the nut 44. In the example embodiment, the chuck sleeve 36 and the nut 44 may be separate and distinct elements to facilitate assembly of the chuck assembly 26. It will be appreciated, however, that the chuck sleeve 36 and the nut 44 may be of a unitary, one-piece construction. It will also be appreciated that, while the chuck assembly 26 is illustrated as utilizing a single chuck sleeve 36, the concepts provided herein may also be applied to a double sleeve chuck assembly as well as hex shank quick release chuck assembly.

In the example embodiment, the chuck sleeve 36 extends between a proximal end 48 and a distal end 50 along the axis 23. The chuck sleeve 36 may be rotatably coupled to the chuck body 30. In this regard, the distal end 50 of the chuck sleeve 36 can rotatably support the chuck body 30. In addition, the chuck sleeve 36 may include a radially inwardly extending flange 52 that rotatably supports the chuck body 30. The flange 52 may be located between the proximal end 48 and the distal end 50 of the chuck sleeve 36 and may generally extend from the chuck sleeve in a direction perpendicular to the axis 23. The flange 52 and the distal end 50 of the chuck sleeve 36 may cooperate with the chuck body 30 to prevent movement of the chuck sleeve 36 relative to the chuck body 30 along the axis 23. The rearward end 39 of the chuck jaws 32 are located forward of the flange 52. A forward end of the bearing assembly 32 and the rearward end of the flange 52 define a gap extending a distance X2 along the axis of rotation. The distance X2 is between one and one-half millimeters and four and one half millimeters. In one configuration, the distance X2 may be substantially equal to three millimeters.

The proximal end 48 of the chuck sleeve 36 can be located adjacent to the gear case 25. In this regard, the distal end 29 of the gear case 25 and the proximal end 48 of the chuck sleeve 36 define a gap having an axially extending distance X1. The distance X1 may be less than five millimeters and, more particularly, between two tenths of one millimeter and three millimeters. In the example embodiment, the distance X1 is substantially equal to 1.0+/−0.5 millimeters. The gap, including the distance X1, allows for the chuck sleeve 36 to rotate freely without rubbing against, or otherwise contacting, the distal end 29 of the gear case 25. Maintaining the gap at a small distance X1 allows the chuck sleeve 36 to have a large outer surface area for a user to grip, prevents dust or other particles from entering the area near the bearing assembly 28 and maintains a pleasing appearance.

As illustrated, the chuck sleeve 36 includes a neck portion 54 extending in the axial direction from and between the flange 52 and the proximal end 48. The neck portion 54 defines an inner chamber or cavity 56. The bearing assembly 28 is located within the cavity 56, such that the neck portion 54 of the chuck sleeve 36 overlaps or annularly surrounds the bearing assembly 28. In this regard, the bearing assembly 28 may be located between the flange 52 and the distal end 29 of the gear case 25 in the axially extending direction. Having a significant chuck sleeve 36 length or area provides more gripping area for a user adjusting the chuck jaws 32. This can allow a user to grip the chuck sleeve 36 in a variety of ways or with more of their hand and, in turn, provide for greater torque for rotating the chuck sleeve 36. On the other hand, extending the chuck sleeve 36 can require increasing the overall length of the tool. By providing a chuck sleeve 36 that overlaps the bearing assembly 28, the length and area of the chuck sleeve 36 can be increased without increasing the length of the drill 10. Alternatively, a chuck sleeve 36 length or area can be maintained while having a compact tool.

Figure 3:
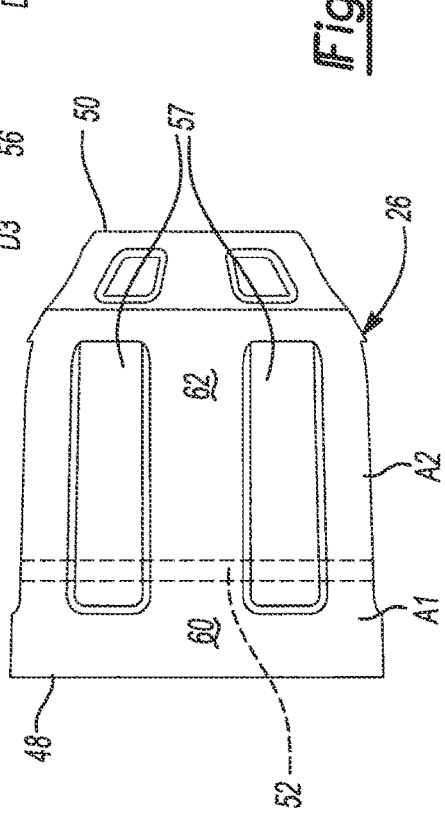
FIG. 3 is a side view of a chuck sleeve of the power tool of FIG. 1.

The chuck sleeve 36 also includes gripping members 57 which may include elongated raised and lowered portions which enable a user to grip the chuck sleeve 36. The chuck sleeve 36 has a desired length such that it can be gripped by a substantial portion of the user's hand. In the example embodiment, the chuck sleeve 36 may have a length such that the user can position his index, middle and ring finger onto the sleeve 36. Thus, the chuck sleeve 36 has a significant surface area which enables the user to apply a significant amount of torque onto the chuck sleeve 36 which, in turn, securely fastens the drill bit into the chuck assembly 26, via the clamping of the jaws 32. In this regard, the chuck sleeve 36 includes a first outer surface 60 and a second outer surface 62. As illustrated in FIG. 3, the first outer surface 60 extends between the flange 52 and the proximal end 48 of the chuck sleeve 36. The first outer surface 60 includes a substantially cylindrical portion having a third diameter D3. The second outer surface 62 extends between the flange 52 and the distal end 50 of the chuck sleeve 36. In one configuration, the second outer surface 62 defines the outer surface of the neck portion 54 of the chuck sleeve 36. Accordingly, the second outer surface 62 may be substantially cylindrical, having a fourth diameter D4 that is substantially equal to the third diameter D3 and substantially equal to, or slightly less than, the first diameter D1 of the gear case 25.

In other configurations of a power tool, a mechanical clutch (not shown), having a diameter or other outer dimension greater than the fourth diameter D4 of the neck portion 54, may be disposed at the distal end 29 of the gear case 25. In these configurations, the mechanical clutch (including the outer dimension thereof) may prevent the proximal end 48 of the chuck sleeve 36, including the neck portion 54, from extending rearwardly to a location adjacent the gear case 25, as described above. In this regard, it will be appreciated that replacing the mechanical clutch with an electronic clutch mechanism, as described above, allows the neck portion 54 to extend rearwardly with the fourth diameter D4 that is substantially equal to the third diameter D3 of the chuck sleeve 36 and substantially equal to the first diameter D1 of the gear case 25.

As illustrated, the first outer surface 60 extends from, and is integrally formed with, the second outer surface 62. The first outer surface 60 has a surface area A1. The second outer surface 62 has a surface area A2. The size of the surface area A1 can be between twenty-five percent and seventy-five percent of the size of the surface area A2. In the example embodiment, the size of the surface area A1 is twenty-eight percent of the size of the surface area A2.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A power tool comprising:
   a driveshaft defining an axis of rotation;
   a gear system coupled to a first portion of the driveshaft, the gear system including a gear case extending along the axis of rotation from and between a proximal end and a distal end;
   a bearing assembly coupled to a second portion of the driveshaft, the bearing assembly extending along the axis of rotation from the distal end of the gear case; and
   a chuck assembly rotatably coupled to a third portion of the driveshaft, the chuck assembly including a chuck sleeve annularly surrounding the bearing assembly along the axis of rotation;
   wherein the chuck sleeve is rotatably coupled to the chuck body; and
   wherein the chuck sleeve annularly surrounds at least one bearing of the bearing assembly about the axis of rotation.

2. The power tool of claim 1, wherein the chuck sleeve includes a radially inwardly extending flange, and wherein the bearing assembly is disposed between the flange and the gear system along the axis of rotation.

3. The power tool of claim 1, wherein the chuck assembly further includes chuck jaws and the chuck sleeve is rotatable to retract and extend the chuck jaws.

4. A power tool comprising:
a housing;
a motor disposed in the housing and defining an axis of rotation;
a gear case coupled to the motor, the gear case including a proximal end and a distal end, the proximal end of the gear case coupled to the housing;
a bearing assembly extending from the distal end of the gear case along the axis of rotation, the bearing assembly supporting a driveshaft for rotation about the axis of rotation; and
a chuck assembly rotatably coupled to the driveshaft, the chuck assembly including a chuck sleeve annularly surrounding the bearing assembly about the axis of rotation;
wherein the chuck assembly includes chuck jaws and a chuck body and the chuck sleeve is rotatably coupled to the chuck body;
wherein the chuck sleeve annularly surrounds at least one bearing of the bearing assembly about the axis of rotation;
wherein the gear case is substantially cylindrical and has a first outer diameter;
wherein the bearing assembly includes a housing that is substantially cylindrical and includes a second outer diameter;
wherein the second outer diameter is less than the first outer diameter;
wherein the chuck sleeve includes a chuck sleeve outer surface that is substantially cylindrical and is adjacent to the gear case, the chuck sleeve outer surface having a third outer diameter that is equal to or less than the first outer diameter;
wherein the chuck sleeve includes a proximal end and a distal end, and wherein the distal end of the gear case and the proximal end of chuck sleeve define a gap extending a distance X1 along the axis of rotation;
wherein X1 is less than or equal to five millimeters;
wherein the chuck sleeve surrounds an entire circumference of the bearing assembly;
wherein the chuck assembly includes a flange portion and the flange portion is operable to prevent the chuck sleeve from moving relative to the chuck body along the axis of rotation; and
wherein the flange portion is coupled to the chuck body.

5. The power tool of claim 4, wherein the chuck sleeve is rotatable to retract and extend the chuck jaws.

6. The power tool of claim 4, wherein X1 is between 0.2 millimeters and 3 millimeters.

7. The power tool of claim 4, wherein X1 is between 0.5 millimeters and 1.5 millimeters.

8. A power tool comprising:
a driveshaft defining an axis of rotation;
a gear system coupled to a first portion of the driveshaft, the gear system including a gear case extending along the axis of rotation from and between a proximal end and a distal end;
a bearing assembly coupled to a second portion of the driveshaft, the bearing assembly extending along the axis of rotation from the distal end of the gear case; and
a chuck assembly rotatably coupled to a third portion of the driveshaft, the chuck assembly including a chuck body, a chuck sleeve annularly surrounding the chuck body, a plurality of chuck jaws having a rearward end slidably supported by the chuck body, and a radially inwardly extending flange adjacent to the rearward end of the chuck jaws,
wherein a forward end of the bearing assembly and a rearward end of the flange define a gap extending a distance X2 along the axis of rotation;
wherein the chuck sleeve is rotatably coupled to the chuck body; and
wherein the chuck sleeve annularly surrounds at least one bearing of the bearing assembly about the axis of rotation.

9. The power tool of claim 8, wherein the distance X2 is between 1.5 millimeters and 4.5 millimeters.

10. The power tool of claim 8, wherein the chuck sleeve is rotatable to retract and extend the chuck jaws.

* * * * *